Oct. 29, 1935.　　　　　A. HUGUENIN　　　　　2,019,226
LUBRICATOR
Filed Nov. 2, 1933　　　3 Sheets-Sheet 1
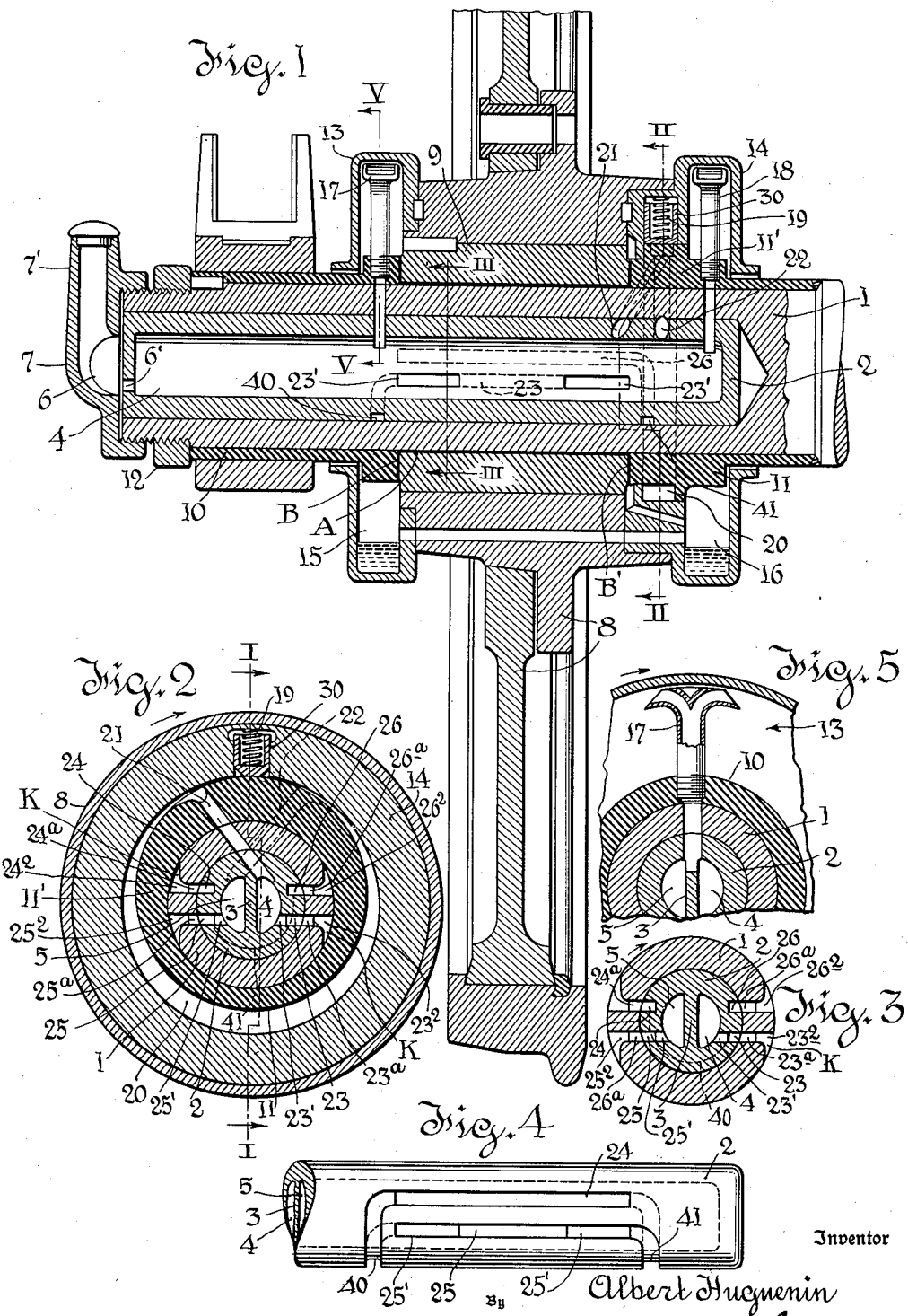
Inventor
Albert Huguenin
Dodge and Sun
Attorneys

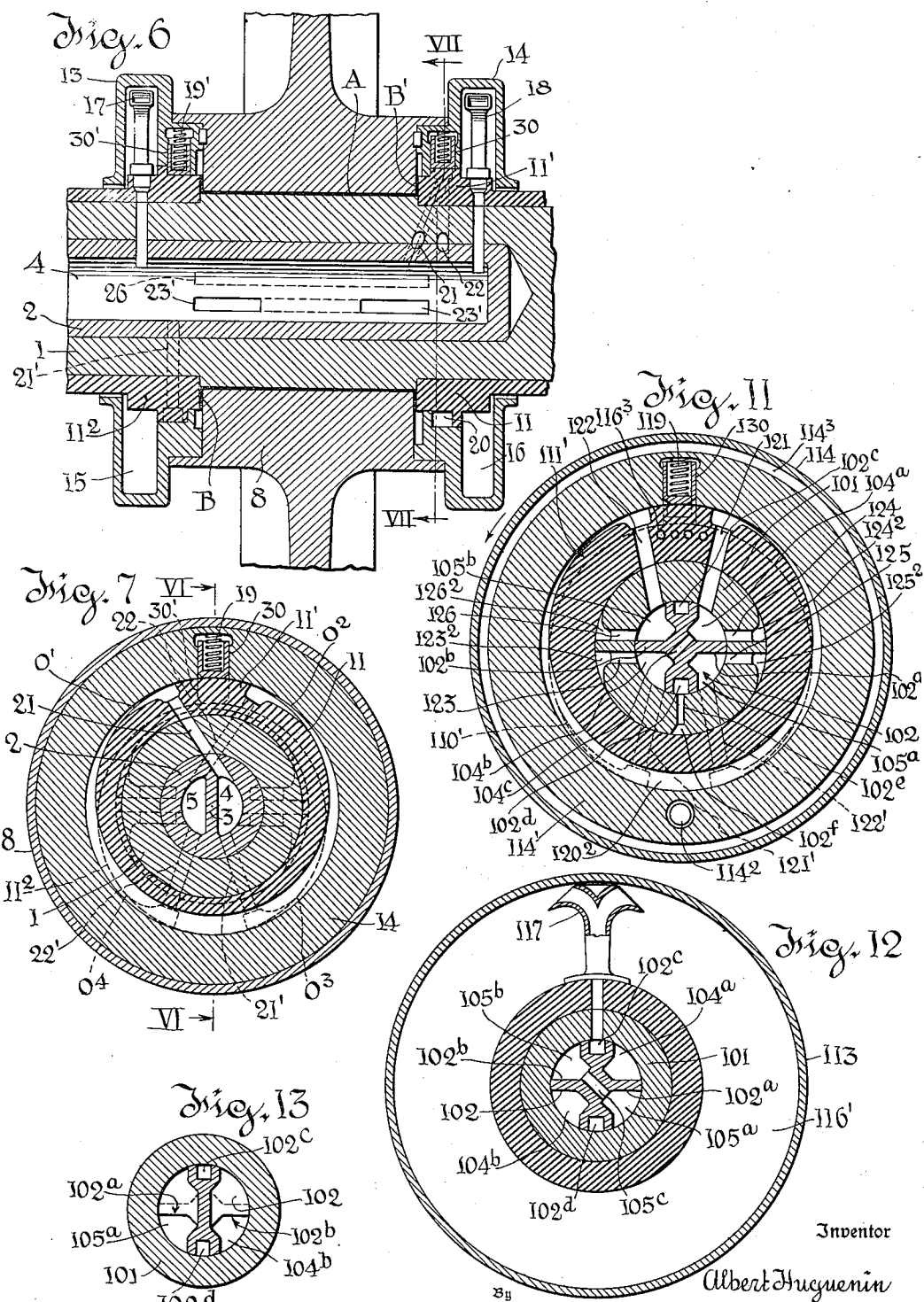

Oct. 29, 1935.  A. HUGUENIN  2,019,226
LUBRICATOR
Filed Nov. 2, 1933  3 Sheets-Sheet 3
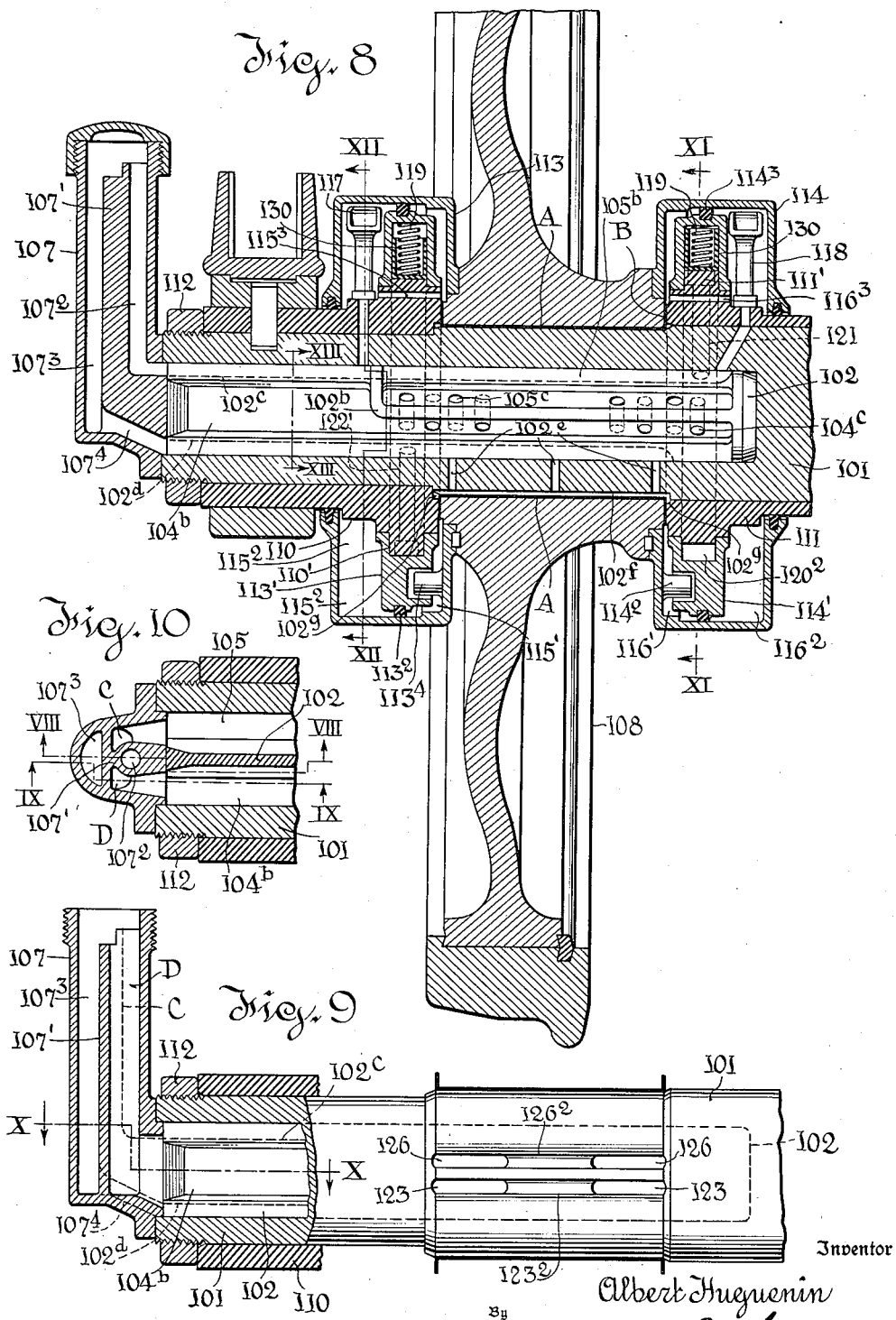

Patented Oct. 29, 1935

2,019,226

UNITED STATES PATENT OFFICE 2,019,226

LUBRICATOR

Albert Huguenin, Zurich, Switzerland

Application November 2, 1933, Serial No. 696,422
In Switzerland November 9, 1932

16 Claims. (Cl. 308—84)

This invention relates to lubricators and particularly to lubricators adapted to supply lubricant to relatively rotating surfaces.

The main object of the invention is to provide for adequate and positive lubrication when the contacting surfaces to be lubricated are moving slowly, as from a standstill, and to insure continuation of lubrication at all speeds irrespective of the temperature and viscosity of the lubricant. In the examples illustrated, the invention is embodied in a wheel of the type employed on railway vehicles, when such wheel is free to rotate on a stationary axle. No limitation to this particular application of the invention is, however, to be implied as the scheme is of general applicability.

The invention comprises means carried by one of the parts to be lubricated, for causing lubricant to be pumped to the bearing surfaces when the motion of the parts does not exceed a predetermined value. When, however, that value is exceeded, the pump is cut out automatically and the lubricant passes then to said bearing surfaces to be lubricated merely by circulation action brought about by the lubricant being dragged along by revolving parts of the lubricator.

The objects and advantages of the invention will be pointed out in the following specification when read in connection with the accompanying drawings, in which:—

Fig. 1 is a vertical longitudinal section through one embodiment of the invention as applied to the left end of an axle of a railway vehicle, the section being taken on the line I—I of Fig. 2;

Fig. 2 is a section on the line II—II of Fig. 1;

Fig. 3 is a section on line III—III of Fig. 1;

Fig. 4 is a side view of a lubricant distributing member which is inserted in the wheel axle, the view being taken as in looking to the right in Fig. 3;

Fig. 5 is a section along the line V—V of Fig. 1, with certain of the parts broken away;

Fig. 6 is a sectional view similar to Fig. 1, but showing a modification, the section being taken on line VI—VI of Fig. 7;

Fig. 7 is a section on line VII—VII of Fig. 6;

Fig. 8 is a vertical longitudinal section similar to that of Fig. 1, but showing a further modification, a portion of the section being indicated by line VIII—VIII of Fig. 10;

Fig. 9 is a side view of the axle construction of Fig. 8 with parts broken away as indicated by line IX—IX of Fig. 10;

Fig. 10 is a horizontal section on line X—X of Fig. 9;

Fig. 11 is a section on line XI—XI of Fig. 8;

Fig. 12 is a section on line XII—XII of Fig. 8; and

Fig. 13 is a section on line XIII—XIII of Fig. 8.

Generally stated, the invention comprises means made up of a part of the axle and journal box and constructed to operate as a force pump to supply lubricant by forced lubrication to the bearing surfaces when the wheel is rotated at a slow speed less than a predetermined value. The parts are so arranged as to cut out the forced lubrication automatically when the wheel exceeds the predetermined speed, said forced lubrication then passing over into a lubrication by circulation. More specifically the rotating and stationary parts of the bearing are constructed to form a displacement pump of the rotary type. This pump has a spring-pressed abutment which is withdrawn from contact with its cooperating surface when the critical speed of the rotating member is exceeded. The lubricant then, because of its viscosity, tends to adhere to the revolving member and is dragged along and continues to circulate through the passages provided for it, but no longer under the hydrostatic pressure provided when the pump is operating.

The details of the invention will be understood by reference to Fig. 1 of the drawings, wherein the reference character I designates the stationary axle of a railway vehicle and 2 is a hollow lubricant distributing member inserted in a bore of the axle I. A partition 3 divides the interior of member 2 into two chambers 4 and 5 to which lubricant may be supplied by either of the means described hereinafter. One end of the member 2 (the left hand end in Fig. 1) is connected to a lubricant reservoir 6 formed by member 7 and having a stationary upstanding portion 7' through a constricted passageway 6' which limits the flow of lubricant from the interior of member 2 to the lubricant reservoir 6.

The wheel, designated 8, has a bearing box 9 of usual construction keyed to it and providing surfaces of rubbing contact designated A with the axle I. Longitudinal movement of the wheel 8 is prevented by two bushings 10 and 11 carried by the axle I rigidly connected to it, these two bushings being held in place by a lock nut 12.

The left hand end of the hub of the wheel 8 has rigidly connected to it an annular lubricant containing housing 13 which engages the end of the bearing box 9 and the rubbing contact surface between the end of this box and the bushing 10, this bearing surface being designated B. Within the housing 13 and carried by the axle I is a stationary lubricant deflecting scoop 17 having two opposed entrance openings, as shown in Fig. 5. The tube to which this scoop is connected directs lubricant through a tube to the chamber 4 of member 2. The right hand end of the wheel, 8 shown in Fig. 1, carries another lubricant housing 14 of generally similar construction to that of the housing 13 and containing lubricant scoop 18 which directs lubricant from the interior of the housing 14 to the chamber 4 of member 2.

The bushing 11 which is fixed to the stationary axle 1 has an eccentrically formed portion 11' confining together with the wall of housing 14 a crescent shaped space 20. A small piston 30 which is allowed a certain amount of play radially is mounted in a recess of the casing 14, said piston 30, being caused to bear against the eccentric 11' by a spring 19, in which case the space 20 is divided by the small piston 30 into suction and pressure chambers. This piston is designed to act as an abutment cutting off communication between the suction and pressure chambers of the pump 11', 14 until the wheel 8 acquires a certain speed. At that speed, centrifugal force causes the piston 30 to be thrown outwardly, overpowering the force of spring 19, and connection between the suction and discharge chambers of the pump is effected, so that the bearing surfaces A and B are no longer lubricated by forced lubrication.

A passage 21 connects the pump chamber 20 with the chamber 4 of the member 2, while a passage 22 connects this chamber 20 with the chamber 5 in the member 2.

The latter contains a plurality of passages and ducts which complete the circulating channels for lubricant both from the pump to the bearing surfaces and from the lubricant scoops 17 and 18 to these same surfaces. The construction of this hollow member 2 is best illustrated in Figs. 2, 3 and 4. Referring to these figures, the member 2 contains four longitudinal grooves 23, 24, 25 and 26. Of these grooves 23 and 24 are connected together by a passage 40 which extends along a portion of the circumference of member 2. In similar manner, grooves 25 and 26 are connected by a passage 41 which likewise extends around a portion of the circumference of member 2. The stationary axle 1 contains longitudinal grooves corresponding to the grooves 23, 24, 25, and 26, and are designated by the same reference characters having the exponent $a$ applied thereto.

The groove 23 in the hollow member 2 is connected to chamber 4 by two slots 23', and by means of two slots $23^2$ and two further slots $24^2$ in the axle 1, which slots $23^2$ and $24^2$ terminate in the form of a wedge at K, the lubricant can pass to the bearing surfaces A, B, B' to be lubricated, a portion of the lubricant passing into the chambers 15, 16. The remainder of the lubricant passes to the chamber 5 through slots $25^2$, $26^2$, grooves 25, 26, passage 41 and slots 25' in hollow member 2 back again into the chamber 5, which communicates by the passage 22 with the suction chamber of the crescent shaped pump chamber 20.

The operation of the lubricator is as follows: As long as the circumferential speed of the wheel 8 is less than the predetermined value necessary to overcome the tension of spring 19, the piston 30 bears against the eccentric 11'. The piston 30, therefore, acts as an abutment to cut off communication between the suction and pressure chambers of the pump 11', 14, and the pump acts to force lubricant from the chamber 20 through passage 21, chamber 4, openings 23', grooves 23 and $23^a$, slots $23^2$, the passage 40, the grooves 24, $24^a$ and slots $24^2$ to the bearing surfaces A, B, and B'. From these surfaces it runs partly through the slots $26^2$, the grooves $26^a$, 26, the passage 41 and the slots $25^2$, the grooves $25^a$, 25 and the slots 25' directly back into the chamber 5, whence it is drawn through the passage 22 into the suction chamber of the pump chamber 20, and then passes through the above described cycle again. The remainder of the lubricant delivered under pressure to the bearing surfaces A, B, B' flows along the radial running surfaces B, B' into the chambers 15, 16 whence it is passed back by the scoops 17, 18 into the chambers 4, 5, so that it returns to the circuit of the lubricant under pressure delivered positively by the rotary piston pump 11', 14. Any fluctuations of pressure arising during the revolution of the wheel 8 are compensated by the column of lubricant in the upstanding portion 7' of the member 7. This circulation starts as soon as the wheel 8 starts to rotate, sufficient lubricant being held within the pump chamber 20 to permit the pump to start working immediately.

When the peripheral speed of the wheel 8 exceeds the above mentioned, adjustable value, the small piston 30 moves outwards against the force of the spring 19, so that now the passages 21, 22 communicate permanently with each other across the crescent shaped chamber 20 of the pump 11', 14. The above described forced lubrication of the running surfaces A, B, B' accordingly passes over merely into a circulation lubrication brought about by the revolving parts 13, 14, the delivery of the lubricant to the bearing surfaces being effectively assisted by the wedge-shaped spaces K. Owing to the fact that the pump 11', 14 as such is thrown out of operation after a certain predetermined peripheral speed has been obtained, firstly losses due to friction, caused by the small piston 30 bearing against the fixed part 11' and secondly unnecessary wear of this small piston and of the eccentric portion 11' are avoided.

By a suitable choice of the strength of the spring 19 any value may be chosen for the said peripheral speed at which the piston 30 cuts out the forced lubrication. It will be clear from Fig. 5 that the scoops 17 and 18 are so formed as to deliver lubricant to both the chambers 4 and 5, regardless of the direction of travel of wheel 8. The description just given applies, except that the direction of lubricant travel with relation to the pump is reversed from that described and indicated by the arrows.

Inasmuch as the apparatus just described is somewhat limited in its capacity to supply lubricant during rotation of the parts at low speeds, it may, in some instances, be preferable to provide two pumps in connection with each wheel 8 to increase the capacity of the system and to provide for uniform and uninterrupted flow. Such an arrangement is shown in Figs. 6 and 7.

Referring to Fig. 6, the structure shown is similar to that described in connection with Figs. 1–5, except that an additional pump has been applied to the left hand end of the wheel hub and the operative parts of the pump have been designated by the same reference characters as those used at the right hand end of the pump by employing exponents. As already described, the stationary axle 1 contains a hollow distributing member 2 and carries a stationary eccentric 11' integral with bushing 11. Eccentric 11' cooperates with the piston 30 to force lubricant through passages 21 and 22 into the hollow member. Where two pumps are employed in order to provide for uniform circulation, the second pump may be installed by providing a second eccentric 11² integral with a bushing on the axle 1 at the left hand end of the hub of wheel 8. Cooperating with the eccentric 11² is a piston 30', which piston is normally forced into contact with the eccentric by a spring 19'. The supplemental pump 11², 13 has discharge and suction ducts 21' and 22' corresponding respectively to the similar ducts 21 and 22 of the pump at the right hand end of the axle.

While both of the pistons 30 and 30' are mounted on top of the axle, the eccentrics 11' and 11² are displaced 180° in the embodiment shown. Consequently, during the time that the pump 11', 14 is inoperative to force lubricant flow, that is, during the time that the piston 30 is travelling from the point O' to the point O² in Fig. 7, the pump 11², 13 is effective to force lubricant to the bearings. On the other hand, when pump 11², 13 is inoperative, i. e. when the piston 30' is passing over its ineffective range between O³ and O⁴, the pump 11', 14 is effective. Consequently, the two pumps operate in conjunction with each other to cause substantially uniform and uninterrupted flow of lubricant to the bearing surfaces as long as speed of the wheel 8 is ineffective to overpower the tension of springs 19 and 19' so as to cut out the respective pumps.

Although it has been indicated that these pumps have their effective ranges displaced by an angle of 180°, it is obvious that the angular displacement may be varied by any desired amount. The scoops are effective in a double pump system in the same manner as has previously been described.

While the forms of the invention just described are effective to improve the lubrication of vehicle wheels and other apparatus of similar character, the preferred form of the invention is shown in Figs. 8–13. In the modification shown in these latter figures, the double pump system has been utilized. However, modifications have been made so as to insure that the depth of lubricant in the storage reservoir may at all times be sufficient to cause the pump chambers to contain lubricant and thus avoid any possibility of the pumps running dry after long periods of inactivity. Means are also provided to prevent leakage from chambers placed in the circuit of the lubricant without absolute dependence upon the tightness of packing contact. As a consequence of this arrangement, the level of the lubricant in the reservoir is always higher than the highest point of the bearing surfaces to be lubricated, thus providing a slight pressure head to maintain the lubricant in contact with the bearing surfaces.

In Fig. 8 where this improved embodiment of the invention is illustrated, the reference characters indicating the various parts correspond as far as possible to those already used, except that each character has been increased by 100. For example, where the fixed axle of Fig. 1 was indicated 1, the axle of Fig. 8 is indicated as 101, and similarly throughout the remainder of the description.

The reference character 102 designates a lubricant distributing member placed within the bore of axle 101. This member is constructed and arranged to form chambers within the bore. Secured to the left hand end (see Fig. 8) of axle 101 and communicating with the bore of that axle, is an upstanding filler tube 107 containing chambers 107², 107³, C, and D, separated from one another by a partition 107'. The member 102 extends throughout the length of the bore within axle 101 and has recesses 102c and 102d (see Fig. 13) in it which extend in an axial direction over practically the whole length thereof and are closed up blind at their inner ends. The recess 102c is arranged to be supplied with lubricant from the scoops 117 and 118 at the two ends of the hub and communicates at its open end with the chamber 107². When the level of lubricant within chamber 107² is high enough to overflow the partition 107', the lubricant passes into the chamber 107³ and thence through passage 107⁴ to the recess 102d. The recess 102d communicates by means of a plurality of radial passages 102e with a longitudinal groove 102f in the axle 101. This groove forms a lubricant reservoir for controlling the supply of lubricant to the bearing surfaces designated A, B. Annular passages 102g at either end of the groove 102f connect this groove with the lubricant circuits served by rotary pumps described hereinafter.

The left hand part of the member 102 consists of a narrow rib-like portion having axial grooves in each exposed end thereof and cooperating with the inside surface of the bore of axle 101 to form passages 102c and 102d (see the hatched portion of Fig. 13) while the cross section of its right hand portion is cruciform, this part being provided with lateral ribs 102a, 102b (see Figs. 11 and 12). The portion of the distributing member 102 of cruciform cross section, together with the axle 101, bounds chambers 104a, 104b, 105a, 105b of which the chambers 104a, 104b communicate with each other through bores 104c (Figs. 8 and 11) and the chambers 105a, 105b, through bores 105c (see Figs. 8 and 12).

As previously described in connection with the other forms of the invention, the pump operating eccentrics 110' and 111' are formed integrally with or are mounted upon the bushings 110 and 111, respectively. The bushings and pump members are held in place on axle 101 by a lock nut 112. Likewise, the housings 113 and 114 are mounted upon and rotate with the hub of wheel 108, suitable packing members being provided at the contact with the bushings 110, 111 to prevent escape of lubricant. The interiors of the housings 113 and 114 carry pins 113⁴ and 114² extending in an axial direction and cooperating loosely with openings in the members 113' and 114' which constitute the casings for the pump chambers, and are similar to the structure shown in Fig. 6, except that the parts 113' and 114' are separate from rather than integral with the housings 113, 114.

In order to prevent lubricant from running out at the bearing surfaces A and B and causing the pump reservoirs to become dry during long periods of standstill, a packing 114³ of annular form extending entirely around the member 114', is provided. This packing is carried in a groove in the member 114' and extends outwardly to contact with the inner surface of the housing 114. The pump chamber 120² has side walls which extend outwardly to prevent gravitation of the lubricant into the chambers 116' or 116² when the parts are idle. The upper portion of the eccentric 111' contains several axial openings 116³ forming a communication between the chambers 116' and 116² on the two sides of the packing 114³ but at a point above any bearing surfaces B, which are to be lubricated. As the lubricant overflows from the surfaces B, it may escape through the openings $116^3$ into the chamber $116^2$.

In similar manner the member $113'$ on the left hand end of the hub of wheel $108$ carries a packing $113^2$ separating the chambers $115'$ and $115^2$, and these chambers are connected by axial openings $115^3$ which function similarly to the axial openings $116^3$ and supply the chamber $115^2$ with lubricant. The scoops $117$ and $118$ are similar to those described in connection with Fig. 1 and further description will be unnecessary.

Since the pumps shown in Fig. 8 are similar in construction to those already described, the details will not be mentioned, except in connection with the description of operation of the complete mechanism. Assuming that the chambers $107^3$, $107^2$, C and D and the passages connecting with them have been filled with lubricant, such as oil, operation of the lubricator shown in Figs. 8–13 is as follows: When the parts are at a standstill, lubricant may flow from the chamber $107^3$ through passageway $107^4$ and recess $102d$ to the radial passages $102e$ and groove $102f$ to the bearing surfaces A, B. Some of this lubricant will flow down into chambers $115'$ and $116'$ where it is prevented from passing into the adjacent chambers $115^2$ and $116^2$, respectively, by the packings $113^2$ and $114^3$. Inasmuch as the reservoir $107$ will be full and its upper end is above the highest point of the surfaces to be lubricated, there will be a slight static pressure head operating at all times to bathe all of the bearing surfaces with lubricant. Lubricant will also be present in the crescent-shaped pump chambers of the two pumps as a residue from the circulation prior to stopping of the parts. Lubricant within these pump chambers is confined, as described in connection with chamber $120^2$.

When the wheel $108$ starts to rotate in a clockwise direction, the housings $113$ and $114$ will rotate with it, thereby causing the relative movement between these housings and the eccentrics $110'$ and $111'$, the pistons $130$ being pressed by the springs $119$ against the cooperating eccentrics $110'$ and $111'$ respectively, thereby shutting off communication between the suction and pressure chambers of these pumps $110'$, $113'$ and $111'$, $114'$. Thus lubricant under pressure is forced through the system supplied by said pumps.

Referring to the pump associated with piston $130$ shown in Fig. 11, assuming the housing rotates in a counterclockwise direction as indicated by the arrow, the circulation will be as follows: When the piston $130$, rotating together with the member $114'$, has passed over the passageway $121$ the suction chamber of the pump $111'$, $114'$ is at the upper left hand side, being connected with the passageway $122$ which supplies lubricant to the crescent-shaped chamber $120^2$. The lubricant in the pressure chamber of said pump is directed to the discharge end of the latter, where it passes through a passageway $121$ to the chamber $104a$, thence dividing into two streams, one of which goes through passages $124$ and the other of which goes through passages $104c$. The passages $124$ convey the lubricant to an enlargement $124^2$ directly to the bearing surfaces A and B, where it drains off into an enlargement $126^2$, then through passages $126$ to chamber $105b$ and thence through the passageway $122$ back to the suction chamber of the pump.

The portion of the lubricant which passes from chamber $104a$ to the passages $104c$ enters the chamber $104b$ and passes through slots $123$ and an enlargement $123^2$ to the bearing surfaces A and B. From the bearing surfaces the lubricant is scraped off into an enlargement $125^2$ and passages $125$ communicating with the chamber $105a$. From this chamber $105a$ it passes through passages $105c$ (Fig. 12) to the chamber $105b$ where it joins the other flow entering through the passages $126$ into said chamber $105b$. This circulation takes place as long as the speed of the wheel $108$ is not sufficient to cause centrifugal force to move the pistons $130$ away from their associated eccentrics $110'$ and $111'$ respectively. This circulation insures that when the parts to be lubricated move after periods of idleness, there shall always be a positive pressure behind the lubricant which is supplied to the bearing surfaces, and hence they can never run dry. Should there be leakage from the bearing surfaces into the chambers $115'$ and $116'$, this leakage can only fill these chambers up to the level of the bottom bearing surface A, since the packings $113^2$ and $114^3$ prevent its escape into the adjoining chambers $115^2$ and $116^2$ which cooperate with the scoops $117$ and $118$.

When the speed of rotation of the wheel becomes great enough to move the pistons $130$ outwardly and out of contact with their associated eccentrics, the lubricant is conveyed to the bearing surfaces A, B merely by circulation action brought about by the relative movement between the members $113'$, $114'$ and the members $110'$, $114'$ respectively.

The lubricant in the chambers $115^2$ and $116^2$ is acted upon by the centrifugal force and is spread out in a thin annular layer around a portion of the inside of the housings $113$ and $114$. Consequently, as these housings rotate, the lubricant is carried against the inlet ends of the scoops $117$ and $118$ and delivered to the recess $102c$, whence it is supplied to the bearing surfaces by overflow from chamber $107^2$ to chamber $107^3$, thence through passage $107^4$ to chamber $102d$ and through radial openings $102e$ to the bearing groove $102f$ to be distributed as described previously. Inasmuch as at low speeds of the wheel $108$ the lubricant is supplied to the bearings under pressure, there will always be an excess flow from the surfaces B through the axial openings $115^3$ and $116^3$ to keep the chambers $115^2$ and $116^2$, respectively, supplied with lubricant and in a position to be acted upon by centrifugal force when the speed of the parts is increased.

In the above description of operation, the forced circulation caused by the right hand pump has been described. The operation of the left hand pump is similar and conveys lubricant in a similar manner from chamber $105a$ through the duct $122'$, to the suction chamber of the pump, the circulation system within the member $102$ as previously traced, and back through duct $121'$ at the pressure side of the pump to the chamber $104b$. As described in connection with Figs. 6 and 7, the two pumps may preferably be displaced by 180° so as to insure uninterrupted flow of lubricant under pressure to the bearings at low speeds.

The passages $102c$, $107^2$, $107^3$, $107^4$, $102d$, which convey the lubricant trapped by the scoops $117$, $118$ and deliver it first to the filler tube $107$ and then from this latter to the bearing surfaces A, B are connected with the lubricant circuits served by the pumps $110'$, $113'$ and $111'$, $114'$ by means of the circular passages $102g$ (Fig. 8). Thus no air lock can prevent lubricant from being supplied to the contact surfaces A and B at all times.

Although it has been indicated in the above description that the two pumps are displaced by 180° one from the other, it is obvious that other suitable spacings may be used and that any desired number of pumps may be employed, either more or less than two, without departing from the spirit and scope of the invention. This invention obviates difficulties arising from dry bearings, since the bearing surfaces to be lubricated are bathed with lubricant under pressure as soon as the parts move, and the circulation is maintained at all speeds. At higher speeds, friction between the parts is diminished by cutting out the pistons 130 and relying entirely upon the circulation action brought about by the relative movement between the members 110′, 113′ and 111′, 114′ of the pumps, the scoops 117, 118 returning the lubricant running out at the bearing surfaces B and leaking into the chambers 115′, 116, into the passage 102 connected to the filler tube 107.

What is claimed is:—

1. In a lubricator for bearings including a stationary bearing element and a rotating bearing element; two means actuated by the relative movement of said elements for supplying lubricant to the bearing surfaces of said elements; and centrifugally operated means for rendering one of said means ineffective for forced delivery at a predetermined speed of rotation of said rotating element.

2. A combination as recited in claim 1 in which one of said means is a pump comprising a stationary eccentric and a rotating casing one carried by each of the bearing elements and the centrifugally operated means is a spring pressed abutment carried by said casing.

3. In a lubricator for bearings including stationary and rotating bearing elements, a rotary piston pump for supplying lubricant under pressure to the bearing surfaces of said elements, said pump comprising a casing revolving with said rotating bearing element, a fixed eccentric piston in said casing confining together with the latter a working chamber, and a centrifugally operated member dividing said working chamber into a suction and a pressure chamber and rendering said pump ineffective for forced delivery when the speed of rotation of the rotating bearing element reaches a predetermined value; and lubricant propelling means effective above said predetermined speed of rotation and rendered active by the relative movement between the casing and the eccentric piston of said rotary piston pump.

4. In a lubricator for bearings including stationary and rotatable bearing elements, a pair of lubricant pumps for supplying lubricant under pressure to the bearing surfaces of said elements, said pumps being carried by said elements one at each end thereof, and having their effective ranges angularly displaced relative to each other; centrifugally operated means forming a part of the pumps for rendering said pumps ineffective for forced delivery when the speed of rotation of said rotatable element exceeds a predetermined value; and means effective above said predetermined speed of rotation for continuing the supply of lubricant to said bearing surfaces.

5. A combination as recited in claim 4 in which the effective ranges of the two pumps are diametrically related.

6. In a lubricator for bearings having stationary and rotatable elements, a plurality of lubricant pumps having their effective ranges angularly displaced relative to one another, said pumps being carried by said bearing elements; means for conducting lubricant from said pumps to the bearing surfaces of said elements; centrifugally operated means associated with each of said pumps for rendering the pumps ineffective for forced delivery at a predetermined speed of rotation of said rotating bearing element; and means causing the lubricant to be conveyed to said bearing surfaces merely by circulation action brought about by the relative movement of the members of said lubricant pumps.

7. In a lubricator for bearings including stationary and rotatable elements, a lubricant pump operated by relative movement between said elements for delivering lubricant under pressure to the bearing surfaces of said elements; means providing communication between the bearing surfaces and said pump; a housing rotatable with said rotatable element; stationary lubricant deflecting means within said housing and in communication with the bearing surfaces for supplying lubricant to the bearing surfaces when the lubricant in said housing is thrown outwardly by centrifugal force; means forming a part of the pump, said means being responsive to centrifugal force for rendering said pump ineffective for forced delivery; and lubricant storing means for maintaining a static pressure head on the lubricant supplied to said bearing surfaces.

8. A combination as recited in claim 7 in which packing means is provided to prevent lubricant escaping from the pump into the housing.

9. In a lubricator for bearings comprising stationary and rotatable elements, a lubricant housing rotatable with said rotatable element; stationary lubricant deflecting means within said housing; a lubricant pump within said housing; packing means for dividing said housing into two parts to prevent lubricant from the bearing surfaces and the pump from flowing into the bottom of said housing under said deflecting means; and means forming a part of the rotatable element and above the bearing surfaces for conveying lubricant to the part of said housing which cooperates with said deflecting means.

10. A combination as recited in claim 9 in which the packing means is an annulus carried by the exterior of the pump and engaging the inner surface of the lubricant housing.

11. The combination of two relatively rotatable elements, one having a bearing and the other a journal turning in said bearing; means effective at high rotary speed to furnish lubricant to the contacting surfaces of said journal and bearing; a pump for furnishing lubricant to said contacting surfaces, and operated by relative rotation of said elements; and speed responsive means forming a part of said pump and effective at a critical speed to render said pump ineffective.

12. The combination of two relatively rotatable elements, one having a bearing and the other a journal turning in said bearing; means effective at high rotary speed to furnish lubricant to the contacting surfaces of said journal and bearing; a displacement pump for furnishing lubricant to said contacting surfaces, and operated by relative rotation of said elements; and speed responsive means forming a part of said pump and capable of movement at a critical rotative speed to render said pump ineffective.

13. The combination defined in claim 11 in which the pump is of the rotary type having a radial vane serving as a displacing abutment, said vane being arranged to move to an inoperative position at a critical rotary speed, under the action of centrifugal force.

14. In a lubricator for bearings including a stationary bearing element and a rotating bearing element, means actuated by the relative movement of said elements for supplying lubricant under pressure to the bearing surfaces of said elements; centrifugally operated means forming a part of said pressure means for rendering said pressure means ineffective for forced delivery at a predetermined speed of rotation of the rotating element; and means for causing continued circulation of lubricant to the bearing surfaces at speeds above said predetermined speed.

15. A combination as recited in claim 14 in which the means actuated by the relative movement of the elements is a displacement pump and the centrifugally operated means is a spring-pressed abutment controlling the connection between the suction and discharge sides of the pump.

16. In a lubricating mechanism for bearings including a rotating bearing element and a stationary journal element mounted therein; a stationary eccentric pump element carried by said journal; a rotary pump element carried by said bearing; an abutment carried by said rotary element; and centrifugally responsive means for urging said abutment into contact with said eccentric element to cause said pump to operate when the rotary element is moving at a rate below a predetermined critical speed, but capable of being displaced centrifugally from the said eccentric to render said pump ineffective, when said rotary element is rotating at speeds above said critical speed.

ALBERT HUGUENIN.